Aug. 14, 1962   A. G. BALL, JR   3,048,913
METHOD OF PRECISELY JOINING WAVEGUIDE CROSS-SECTIONS
Filed Oct. 10, 1958
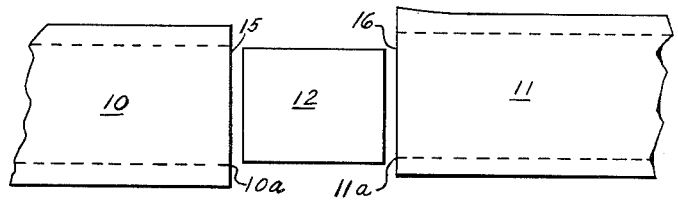
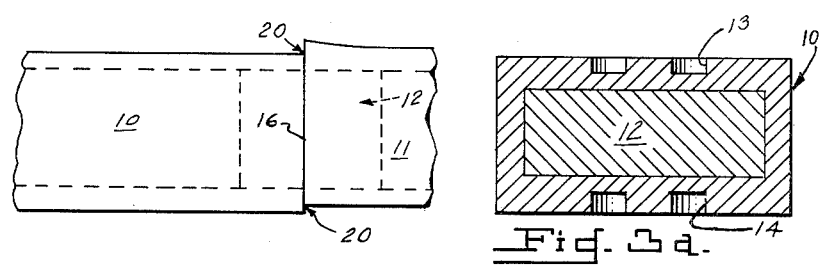
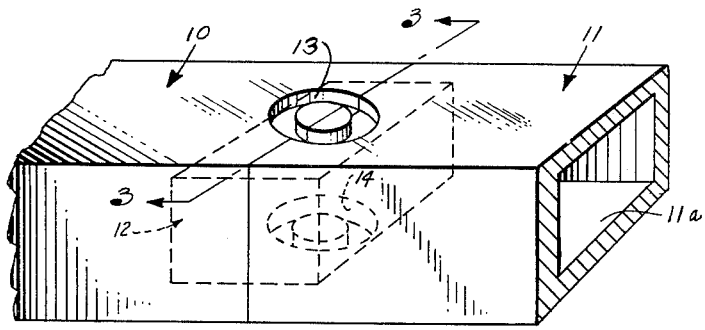
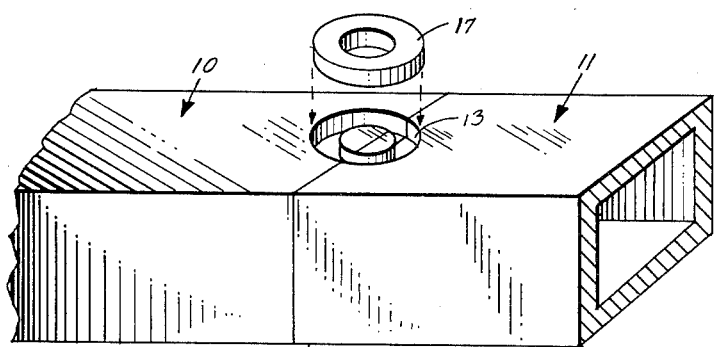
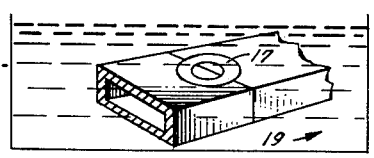
INVENTOR
ARTHUR G. BALL, JR.
BY S. J. Rotondi, A. J. Dupont
and J. D. Edgerton
ATTORNEYS.

United States Patent Office 3,048,913
Patented Aug. 14, 1962

3,048,913
METHOD OF PRECISELY JOINING WAVEGUIDE CROSS-SECTIONS
Arthur G. Ball, Jr., 9212 Adelaide Drive, Bethesda, Md.
Filed Oct. 10, 1958, Ser. No. 766,629
4 Claims. (Cl. 29—155.5)
(Granted under Title 35, U.S. Code (1952), sec. 266)

The invention described herein may be manufactured and used by or for the Government for governmental purposes without the payment to me of any royalty thereon.

This invention relates generally to means and methods for permanently connecting abutting waveguide sections so that the cross-sections formed by the inner dimensions of the waveguides will be in precise alignment. In particular, this invention provides a simple and inexpensive method for holding the waveguides in precise alignment during brazing.

If permanently connected waveguide sections are to function satisfactorily, it is necessary that the cross-sections of the waveguides be in precise alignment. When permanently connecting waveguide sections by brazing, therefore, some means must be provided to hold the waveguide cross-sections in precise alignment while the connecting joint between waveguide sections is immersed in a brazing solution. It is further desirable that the means which are used to hold and align the cross-sections be such that they will be also permanently connected to the sections by the brazing operation.

It is an object of this invention to provide a simple and inexpensive method of permanently connecting waveguide sections so that the cross-sections of the waveguides will be in precise alignment.

It is another object of this invention to use the means which accomplishes alignment to form a permanent connection across the abutting ends of the waveguide sections, thereby increasing the strength of the brazed joint and also eliminating the necessity of removing the alignment means.

The improved method of this invention effects precise alignment of the cross-sections of waveguide sections by cutting common circular grooves in the abutting ends of each section while the cross-sections are held aligned by an aligning block, and thereafter pressing a ring into each common circular groove to hold the abutting ends in precise alignment. The joint formed between the abutting ends of the waveguide sections and the connecting rings are then permanently joined by brazing.

The specific nature of the invention, as well as other objects, uses, and advantages thereof, will clearly appear from the following description and from the accompanying drawing, in which:

FIGURE 1 shows a plan view of the waveguide sections before they are slid over the aligning block.

FIGURE 2 is a plan view showing the aligning block aligning the cross-sections of the waveguide sections.

FIGURE 3 shows in perspective the circular grooves cut into opposite outer surfaces of the waveguides.

FIG. 3a is an end view of FIG. 3 taken through section lines 3—3.

FIGURE 4 is a perspective showing the waveguides positioned so that the circular grooves can receive the aligning and connecting rings.

FIGURE 5 is a schematic perspective view of the waveguides and rings in the brazing solution.

The drawing schematically shows the method in accordance with the invention of joining in precise alignment the cross-sections 10a and 11a of waveguides 10 and 11.

FIGURE 1 shows the positions of the waveguide sections 10 and 11 before the cross-sections 10a, 11a, are slid over the aligning block 12. The waveguide sections 10 and 11 are composed of any suitable metal commonly used in the waveguide art such as aluminum or brass. Aligning block 12 can be composed of a metal such as steel or brass, or it may be composed of a plastic such as an epoxy resin. The block 12 is dimensioned to the shape of the cross-sections 10a and 11a but slightly smaller in size to permit the waveguide sections to be slid over the block 12. The block 12 should be accurately dimensioned because the preciseness of the alignment of cross-sections 10a and 11a depends upon the dimensional accuracy of block 12.

The cross-sections 10a and 11a are slid over the surfaces of block 12 and the waveguide sections 10 and 11 are forced together until ends 15, 16 meet (FIGURE 2). The friction between the surfaces of block 12 and the surfaces of the cross-sections should be large enough to hold the waveguides 10 and 11 in the abutting relationship as shown in FIGURE 2. Regardless of the irregularities of the outer surfaces of the waveguides 10 and 11, precise alignment of the waveguide cross-sections is insured by the aligning block 12.

While the waveguides 10 and 11 are aligned as shown in FIG. 2, they are clamped in position under some type of metal removing machine which is capable of cutting circular grooves 13, 14 into the outer surfaces of the waveguides. As shown in FIGURE 3, the grooves 13, 14 will have one circumferential portion in the outer surface of one waveguide and another circumferential portion in the outer surface of the abutting waveguide. A milling machine or a boring machine may be used for this purpose. While the depth to which the grooves are cut is not particularly critical, it will be evident to those skilled in the art that the deeper the grooves are in the waveguide surfaces, the stronger the ultimate joint will be. Two grooves are shown in FIGURES 3 and 4 and represent the preferred number of grooves according to this invention. However, if the joint strength is to be increased, then more than two grooves may be cut in the outer surfaces of the waveguides 10 and 11.

After the grooves 13, 14 have been cut, the waveguide sections 10, 11 are unclamped from the metal cutting machine and the sections 10 and 11 are pulled apart so that block 12 can be removed. After block 12 is removed, the waveguide sections 10 and 11 are held together while rings 17 and 18 are pressed into the grooves 13, 14. Rings 17 and 18 are preferably composed of the same metal as that of waveguides 10 and 11 and are accurately dimensioned to snugly fit the grooves 13, 14, the fit of the rings 17 and 18 being sufficiently tight to hold the waveguide sections 10 and 11 together without further support. Thus, the connected sections can be handled without fear that the cross-sections 10a and 11a will move out of alignment.

It will be apparent that when rings 17, 18 are seated in grooves 13, 14 the cross-sections 10a and 11a will be held precisely aligned. It should be noted that precise alignment of the cross-sections 10a and 11a is thereby attained regardless of the variations in the outer surfaces of sections 10 and 11 as is illustrated at numerals 20 in FIG. 2.

The joint formed between ends 15, 16 is immersed in a brazing solution 19 (FIGURE 5 in any convenient manner. This brazing operation permanently connects the joint and the rings in the grooves. The rings 17 and 18 when brazed provide additional strength at the joint.

It will be evident from the foregoing description that the invention provides a simple and inexpensive method for precisely connecting waveguide cross-sections so that they will be in precise alignment.

I claim as my invention:

1. An improved method of joining the ends of abutting waveguide sections having substantially identical cross-sections at said ends so that the waveguide cross-sections will be in precise alignment, said method comprising: sliding each waveguide cross-section over opposite ends of an aligning block having a slightly smaller cross-section than the cross-sections of the waveguide so that the waveguide cross-sections are precisely aligned with their ends in abutting relationship, cutting an annular groove into the outer surface of said waveguide sections adjacent the abutting ends thereof while they are so positioned, said groove being cut so that the waveguide material surrounded by said groove is comprised of a portion of each of said waveguide sections, separating the sections so that said aligning block can be removed, approximately realigning the waveguides in abutting relationship, and contacting more than one-half of the inner cylindrical surface of said annular groove with a rigid member so as to realign and hold said cross-sections in precise alignment.

2. An improved method of joining the ends of abutting waveguide sections having substantially identical cross-sections so that the waveguide cross-sections will be in precise alignment, said method comprising: sliding each waveguide cross-section over opposite ends of an aligning block having a slightly smaller cross-section than the cross-sections of the waveguide so that the waveguide cross-sections are precisely aligned with their ends in abutting relationship, cutting circular grooves into the outer surfaces of the waveguide sections while they are so positioned so that the waveguide material surrounded by said grooves is comprised by a portion of each of said waveguide sections, separating the waveguide to remove said aligning block, approximately realigning the ends of the waveguides, and pressing a circular ring snugly into each circular groove so as to realign and hold the waveguide cross-sections in precise alignment.

3. An improved method of joining the ends of abutting waveguide sections having equal cross-sections so that the waveguide cross-sections will be in precise alignment, said method comprising: sliding each waveguide cross-section over opposite ends of an aligning block having a slightly smaller cross-section than the cross-sections of the waveguide so that the waveguide cross-sections are precisely aligned with their ends in abutting relationship, cutting circular grooves into the outer surfaces of the waveguide sections while they are so positioned so that the waveguide material surrounded by said grooves is comprised by a portion of each of said waveguide sections, separating the waveguide to remove said aligning block, approximately realigning the ends of the waveguides, pressing a circular ring snugly into each circular groove so as to realign and hold the waveguide cross-sections in precise alignment, and thereafter permanently connecting the aligned cross-sections by brazing.

4. An improved method of joining the ends of abutting waveguide sections having equal cross-sections so that the waveguide cross-sections will be in precise alignment, said method comprising: sliding each waveguide cross-section over opposite ends of an aligning block having a slightly smaller cross-section than the cross-sections of the waveguide so that the waveguide cross-sections are precisely aligned with their ends in abutting relationship, clamping the waveguide sections together while their ends abut, cutting circular grooves into the outer surfaces of the waveguide sections while the sections are clamped together so that the waveguide material surrounded by said grooves is comprised by a portion of each of said waveguide sections, removing the clamping means, separating the waveguide sections, removing the aligning block, substantially realigning the ends of the section, pressing a circular ring snugly into each of said circular grooves while the ends are held together in substantial realignment, the rings in the circular grooves when so pressed precisely realigning the cross-sections, and thereafter permanently connecting the cross-sections by brazing.

It should be understood that although a rectangular cross-section has been shown in the drawing, the method may also be applied to other types of cross-sections.

It will be apparent that the embodiment shown are only exemplary and that various modifications can be made in construction and arrangement within the scope of the invention as defined in the appended claims.

References Cited in the file of this patent

UNITED STATES PATENTS

| | | |
|---|---|---|
| 687,789 | Rhynedance | Dec. 3, 1901 |
| 1,069,538 | Evans | Aug. 5, 1913 |
| 1,584,069 | Anderson | May 11, 1926 |
| 1,672,562 | Evans | June 5, 1928 |
| 1,985,531 | Swenson | Dec. 25, 1934 |
| 1,990,077 | Kershaw | Feb. 5, 1935 |
| 2,380,628 | Zempel | July 31, 1945 |
| 2,480,598 | Ost | Aug. 30, 1949 |
| 2,505,424 | Moseley | Apr. 25, 1950 |
| 2,800,705 | Ingalls et al. | July 30, 1957 |
| 2,923,902 | Pajak | Feb. 2, 1960 |
| 2,930,007 | Anderson | Mar. 22, 1960 |
| 2,948,954 | Ramsa | Aug. 16, 1960 |

OTHER REFERENCES

Southworth: Principles and Applications of Waveguide Transmission, "Permanent Connectors," paragraph 1, pages 198–199. D. Van Nostrand Co., Inc., New York, N.Y. 1950.